Jan. 10, 1956

T. R. SMITH 2,730,197

ARTICULATED CONNECTIONS

Filed Oct. 6, 1951

Inventor
Thomas R. Smith

By

James K. Mosser
AGENT

Jan. 10, 1956  T. R. SMITH  2,730,197
ARTICULATED CONNECTIONS
Filed Oct. 6, 1951  2 Sheets-Sheet 2

Inventor
Thomas R. Smith
By
James X. Mosser
Agent

United States Patent Office 2,730,197
Patented Jan. 10, 1956

2,730,197
ARTICULATED CONNECTIONS

Thomas R. Smith, Newton, Iowa, assignor to The Maytag Company, Newton, Iowa, a corporation of Delaware Application October 6, 1951, Serial No. 250,151

11 Claims. (Cl. 188—17)

The invention relates to articulated connections and more particularly to an articulated connection incorporating an expansible clutch element.

Among the objects of the invention is to provide a pair of relatively rotatable members with an articulated connection therebetween, which normally provides a rigid connection for locking the members against relative movement, but is readily manipulated to permit relative rotary movement of the members.

In accordance with the invention a pair of relatively rotatable members are provided with a double tapered spiral clutch element disposed therebetween for normally locking the members against relative rotary movement. This clutch element has its central portion anchored to one of the members and its opposite ends are placed under the control of manually operated mechanism for releasing the clutch element to permit relative movement between the members to an infinite number of positions.

Accordingly, another object of the invention is to provide a pair of relatively movable members normally locked against relative movement by a double tapered spiral clutch element, which is readily releasable to permit relative adjustment between the members.

A further object of the invention is to provide a pair of relatively rotatable members with a locking spiral clutch element which permits locking of the members with respect to each other at an infinite number of positions.

Yet another object of the invention is to provide a pair of rotatable members normally locked against relative movement by a unidirectionally wound double tapered spiral clutch element which is releasable by manual operation of a single movable element for simultaneous movement of the ends of the clutch element in opposite directions to contract the same to release the members for relative movement.

It is another object of the invention to provide a pair of relatively movable members with a spiral clutch element therebetween, which has a central load carrying portion of relatively large cross section and tapers in both directions to terminate in end portions of relatively narrow cross section to provide a clutch having a minimum length with sensitive pick-up end portions.

Still another object of the invention is to provide an adjustable locking connection for a pair of relatively rotatable members which is smooth in operation, simple in construction, and reliable.

Other objects, features, capabilities and advantages are comprehended by the invention as will later appear, and as are inherently possessed thereby.

Referring to the drawings.

Figures 1, 2:
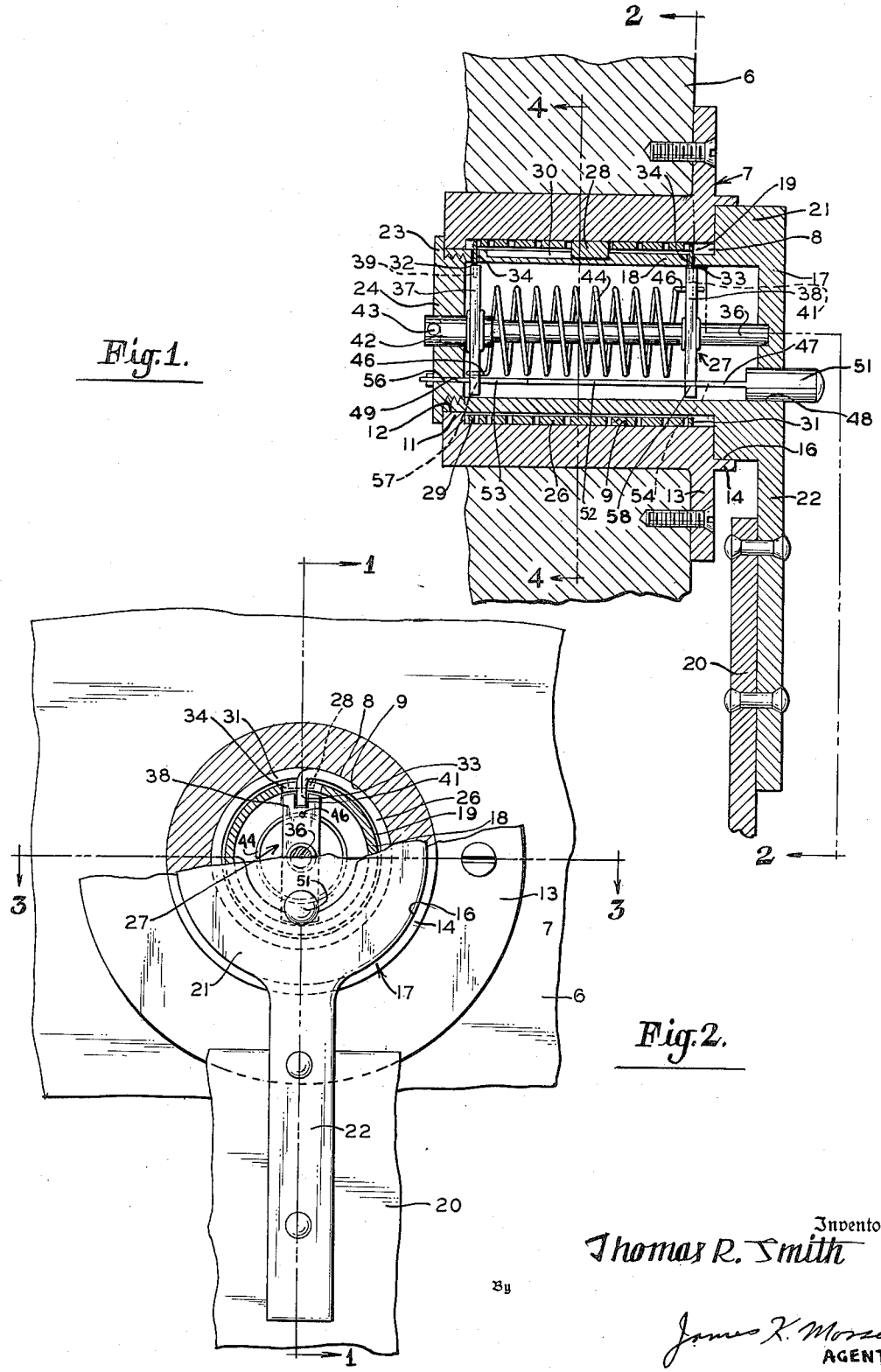
Figure 1 is a longitudinal vertical sectional view of the improved articulated locking connection for a pair of relatively movable members made according to the invention, and taken along the line 1—1 of Figure 2.
Figure 2 is a transverse view partly in section of the improved locking connection taken generally along the line 2—2 of Figure 1.
Figure 3:
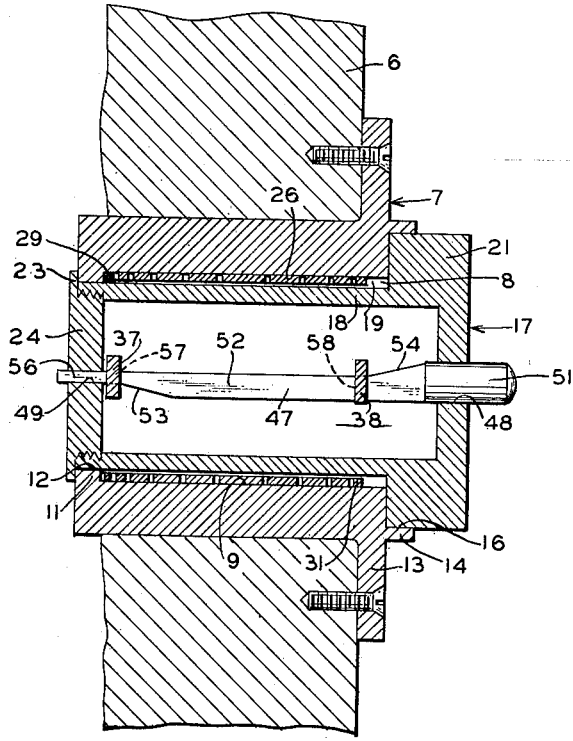
Figure 3 is a longitudinal horizontal sectional view of the locking connection taken along the line 3—3 of Figure 2; and, Figure 4 is a transverse vertical sectional view of the connection taken along the line 4—4 of Figure 1.
Figure 4:
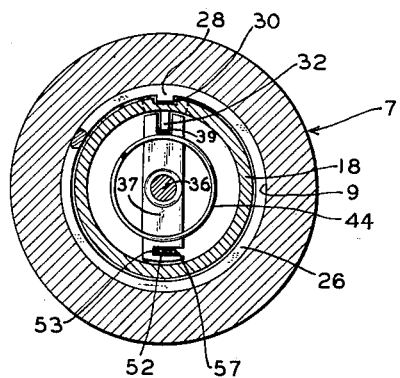

Referring now more in detail to the drawings for one form of an articulated connection embodying the features of the present invention, there is shown a stationary support 6 to which is secured in any suitable manner a first or fixed member, generally indicated at 7, having an axially extending cylindrical bore or opening 8 therein defining a clutch surface 9. Adjacent one end of the cylindrical bore 8 is an inwardly extending flange 11, providing a bearing surface 12, and adjacent the opposite end of the bore 8 is an outwardly extending flange 13 carrying an axially projecting ring 14 whose inner periphery provides a bearing surface 16, and a relatively rotatable mating or second member, generally indicated at 17, is shown journalled by the bearing surfaces 12 and 16 in the fixed member 7. The rotatable member 17 comprises a hollow cylindrical sleeve 18 spaced from the clutch surface 9 to provide an annular clutch pocket 19. The rotatable member 17 further includes a hub 21 formed integral with the sleeve 18 and an arm 22 formed integral with and extending radially from the hub which may be secured in any manner to any suitable movable support 20. This rotatable member 17 is held against relative axial displacement by means of the hub 21 and a thrust collar 23 carried by a plate 24 threaded into the open end of the cylindrical sleeve 18.

While the two members 7 and 17 are described as fixed and rotatable, respectively, the members are relatively rotatable; therefore, it is to be understood that for the purpose of this invention it is immaterial which of the members, if either, is fixed.

In order to vary the relative position of the members 7 and 17, clutch mechanism in the form of a coil-type clutch spring or element 26 and control means or mechanism therefor, generally referred to at 27, is shown carried by the rotatable member 17. In this instance, the clutch element 26 is carried in the clutch pocket 19 and is wound in a continuous spiral to loosely encompass the hollow sleeve 18. An integral inwardly projecting lug or anchoring means 28 is located intermediate ends 29 and 31 of the clutch element 26, and it is received in a mating slot 30 formed in the outer periphery of the sleeve 18 to provide a positive driving means between the sleeve 18 and clutch element 26 for rotary movement in either direction.

To transmit the desired load, the cross-sectional area of the convolute of the clutch element 26 at the lug 28 is relatively large, and since the cross-sectional area of the remainder of the clutch element 26 may be less than at the transmitting portion, each convolute of the clutch element extending in both directions from the lug is tapered or reduced in cross-sectional width toward the opposite ends 29 ad 31. It can be seen that with a construction of this type the ends are relatively narrow in width, and due to this the end portions are relatively flexible. This flexibility of the ends provides the energizing sections, which, when held in engagement with the clutch surface 9, insures proper operation of the clutch. Also, by utilizing a coil clutch of this type the over-all length of the clutch element 26 may be reduced because of the over-all reduction in the cross-sectional width of each convolute; therefore, the length of the entire assembly may be reduced accordingly.

The clutch element 26 is die cast or molded in a permanent mold and is in the shape of a coil wound in one direction. Any suitable materials, such as, for example, aluminum, steel, or plastic, may be used to make the clutch element 26 and may be either resilient or non-resilient.

In order to provide means for acting on the energizing ends 29 and 31 of the clutch element, each end has an integral inturned tab or bent portion 32 and 33, respectively, which extends radially inwardly through enlarged mating arcuate slots 34 formed in the cylindrical sleeve 18. The slots 34 are wide enough longitudinally for the tabs 32 and 33 to move freely therein, and are long enough in the transverse direction to permit the tabs freedom of movement for control of the clutch element 26.

A rotatable support 36 extends longitudinally through the cylindrical sleeve 18 along the axis thereof, and it has a pair of axially spaced rotatable arms or discs 37 and 38 mounted thereon in such position that the inturned tabs 32 and 33 on the clutch element 26 are each secured in mating slots 39 and 41 provided in the arms 37 and 38, respectively, adjacent their outer extremities. Each of the arms is mounted for arcuate rotary movement about the axis of the support 36 and one of the arms 37 is rigidly secured thereon, while the other arm 38 is secured to a sleeve 42 which is freely journaled on the support 36 and held against axial displacement by means of an aligning pin 43.

A loaded torsion spring 44 is mounted around the support 36 between the spaced rotatable arms 37 and 38 and its opposite ends 46 are adapted to engage the arms in such manner as to provide opposite turning moments to them. These turning moments are applied to the tabs 32 and 33 of the clutch element and are in the direction to expand and hold both of the energizing ends of the clutch element in engagement with the clutch surface 9.

Carried by the rotatable member 17 parallel to its axis of rotation, is a longitudinally extending bar or actuating member 47 which is supported for axial movement by spaced bearing surfaces 48 and 49. The actuating member 47 includes a forward outwardly projecting pin or button portion 51, a rectangular bar portion 52 having axially spaced cam surfaces 53 and 54 thereon carried within the hollow sleeve 18 and an end portion 56 supported in the bearing 49. The cam surfaces 53 and 54 are disposed on opposite sides of the rectangular bar 52 and lie adjacent their respective mating slots 57 and 58 provided in the lower ends of the arms 37 and 38. The slots 57 and 58 open on opposite sides of the arms to accommodate their respective cam surface, and when the clutch connection is in the position as shown, the arms 37 and 38 and cams 53 and 54 are out of effective contact with each other and the actuating member 47 has no influence on the clutch element 26.

Now, assuming the button 51 is depressed or moved to the left, as shown in the drawings, it can be seen that the cam surfaces 53 and 54 move in the direction to engage the arms 37 and 38 at the bottom of their respective slots 57 and 58 and since these cams are on opposite sides of the bar 52, the arms are rotated or pivoted in opposite directions about the support 36. The movement of the arms in opposite directions acts to wind up or compress the torsion spring 44 to increase its loading, and at the same time the slots 39 and 41 in the upper end of the arms simultaneously pull or move the tabs 32 and 33 in opposite directions to contract or wind the energizing ends 29 and 31 of the coil clutch element 26 out of contact with the clutch surface 9, to thereby permit relative rotary movement between the two members 7 and 17 to any desired position.

After the members 7 and 17 have been moved or rotated relatively to the desired position, the pressure on the button 51 is released. The loaded torsion spring 44 applies its force to rotate the arms 37 and 38 in opposite directions counter to the movement imparted by the actuating member 47. This movement is against the cam surfaces 53 and 54 and in such direction to move the actuating member 47 outward to its neutral position. At the same time the tabs 32 and 33 on the ends of the coil clutch 26 are likewise moved in the direction to simultaneously unwind both of the energizing ends 29 and 31 of the clutch element into engagement with the clutch surface 9. As soon as the energizing ends of the clutch element contact the clutch surface 9 rotary movement of the arms 37 and 38 is terminated and the loaded torsion spring 44 merely applies a constant force to both tabs to insure that the energizing ends always remain in contact with the clutch surface.

Thus it can be seen that with an articulated connection of the coil clutch type shown, wherein the central portion of the clutch element is anchored to one of the members 7 or 17, that if a force is applied to either member in one direction tending to change its relative position, either the energizing end 29 or 31, depending upon the direction of the force, acts to actuate that half of the clutch element 26 between it and the lug 28 to prevent such movement, while the other half of the clutch element 26 performs no function. Should the force be applied in the opposite direction, the opposite energizing end of the coil acts to actuate that half of the coil 26 while the other half remains inactive.

In addition, by providing an oppositely tapered coil type clutch element of the type described, the over-all length of the clutch and assembly may be reduced because the pick up or energizing ends are relatively narrow with respect to the central load carrying portion.

Although this device is shown as a straight locking device, it is possible to provide the bar 52 and cams 53 and 54 with detents or the like to contract either end 29 or 31 selectively to make a one way drive in the selected position, and it could be used in any number of installations where selective rotation of the driving member is desired.

In some installations it is possible to eliminate the torsion spring 44 for expanding the energizing ends 29 and 31 into engagement with the clutch surface 9 by using a resilient clutch element in which the energizing ends are slightly oversize to normally maintain contact with the clutch surface. Under these conditions when the actuating member 47 is released, the natural resiliency of the ends of the clutch element expand the same into engagement with the clutch surface 9 and will rotate the arms 37 and 38 to move the actuating member 47 outwardly to its neutral position.

An articulate connection of this type has many applications, such as, for example, a hinge or the like for folding legs, a lock tumbler mechanism, adjustable furniture, and many other devices wherein it is desired to lock a pair of members with respect to each other in any of an infinite number of positions.

While I have herein described and upon the drawings shown an illustrative embodiment of the invention, it is to be understood that the invention is not limited thereto but may comprehend other constructions, arrangements of parts, details and features without departing from the spirit of the invention.

It is claimed:

1. In an articulated connection, the combination of a first member having a cylindrical bore therein, a second member including a cylindrical sleeve mounted within said bore, said first and second members being relatively rotatable, a spiral clutch element having a plurality of convolutes wound in the same direction encompassing said sleeve and associated with said members to normally lock the same against relative rotary movement, said clutch element having an integral lug on one of its central convolutes for anchorage to one of said members and opposite end portions for simultaneously engaging the other of said members to lock the same against relative rotary movement, and means including a manually operable element to engage and simultaneously move said end portions of said clutch element out of clutching engagement with said other of said members to permit relative rotary movement between said members.

2. In an articulated connection, the combination of a first member having a cylindrical bore therein, a second member including a cylindrical sleeve mounted within said bore, said first and second members being relatively rotatable, a spiral clutch element having a plurality of convolutes wound in the same direction encompassing said sleeve and associated with said members to normally lock the same against relative rotary movement, said clutch element having an integral lug on one of its central convolutes for anchorage to one of said members and opposite end portions for simultaneously engaging the other of said members, spring loaded means for normally biasing said end portions of said clutch element in its clutching position to lock said members against relative rotary movement, and manually operable means for engaging said last named means to simultaneously move said end portions of said clutch element out of clutching engagement with said other of said members to permit relative rotary movement between said members.

3. In an articulated connection, the combination of a first member having a cylindrical bore therein, a second member including a cylindrical sleeve mounted within said bore, said first and second members being relatively rotatable, a spiral clutch element encompassing said sleeve and associated with said members to normally lock the same against relative rotary movement, said clutch element having a relatively wide central section with an integral lug thereon for engaging one of said members and oppositely directed convolutes of decreasing cross section extending from said central section and terminating in relative narrow energizing end portions for simultaneously engaging the other of said members to lock the same against relative rotary movement, and means including a manually operable element to engage and simultaneously move the energizing end portions of said clutch element out of clutching engagement with said other of said members to permit relative rotary movement between said members.

4. In an articulated connection, the combination of a first member having a cylindrical bore therein, a second member including a cylindrical sleeve mounted within said bore, said first and second members being relatively rotatable, a spiral clutch element encompassing said sleeve and associated with said members to normally lock the same against relative rotary movement, said clutch element having a relatively wide central section with an integral lug thereon for engaging one of said members and oppositely directed convolutes of decreasing cross section extending from said central section and terminating in relatively narrow energizing end portions for simultaneously engaging the other of said members, spring loaded means for normally biasing the energizing end portions of said clutch element in its clutching position to lock said members against relative rotary movement, and manually operable means for engaging said last named means to simultaneously move the energizing end portions of said clutch element out of clutching engagement with said other of said members to permit relative rotary movement between said members.

5. In an articulated connection, the combination of a first member having a cylindrical bore therein, a second member including a cylindrical sleeve mounted within said bore, said first and second members being relatively rotatable, a spiral clutch element encompassing said sleeve and associated with said members to normally lock the same against relative rotary movement, a support carried by one of said members, said clutch element having a central section with an integral lug thereon for engaging said support carrying member and oppositely directed convolutes extending from said central section terminating in end portions for engaging the other of said members, a pair of oppositely rotatable axially spaced arms carried by said support, means for connecting said arms to said end portions of said clutch element, a torsion spring mounted between said arms and secured thereto for biasing said arms toward rotation in opposite directions to normally bias said end portions into clutching engagement with said other of said members to lock the same against relative rotary movement, and a slidable bar mounted parallel to said support and having cam surfaces thereon for engaging said arms on opposite sides thereof for rotating said arms in opposite directions to move the end portions of said clutch element out of engagement with said other of said members to permit relative rotary movement between said members.

6. In an articulated connection, the combination of a first member having a cylindrical bore therein defining a clutch surface, a second member including a cylindrical sleeve mounted within said bore for relative rotary movement, a spiral clutch element encompassing said sleeve and having convolutes converging in width from a centrally located convolute toward oppositely positioned ends of said clutch element, means for anchoring the central convolute of said clutch element to said sleeve, means for simultaneously biasing the ends of said clutch element into clutching engagement with said clutch surface to lock said members against relative rotary movement, and means for simultaneously rotating the ends of said clutch element out of engagement with said clutch surface to permit relative rotary movement of said members in either direction.

7. In an articulated connection, the combination of a first member having a cylindrical opening therein defining a clutch surface, a second member having a cylindrical sleeve mounted within said opening and being relatively rotatable with respect to said first member, a spiral clutch element disposed between said clutch surface and said sleeve, said clutch element including a relatively wide section anchored to said sleeve with oppositely extending convolutes converging in width and terminating in relatively narrow ends, spring biased means for normally maintaining both of said ends expanded into clutching engagement with said clutch surface to lock said members against relative rotary movement, and manually operable means for engaging said last named means to simultaneously rotate the ends of said clutch element in a direction to disengage said clutch surface to permit relative rotary movement between said members.

8. An articulated connection, comprising a first member with a cylindrical opening therein defining a friction surface, a second member having a cylindrical sleeve journalled for relative rotary movement within said cylindrical opening, a resilient spiral element surrounding said sleeve and engageable with said friction surface, said spiral element including a relatively wide central section anchored to said sleeve and convolutes on either side thereof converging in width toward both ends of said spiral element, said ends normally maintaining frictional engagement with said friction surface to lock said members against relative rotary movement, and means including a manually operable element carried by said rotatable member for simultaneously rotating the ends of said spiral element in a direction to disengage said friction surface to permit relative rotary movement between said members.

9. An articulated connection, comprising a first member having a cylindrical sleeve, a second member having a cylindrical bore therein defining a friction surface and encompassing said sleeve for relative rotary movement, a resilient spiral element surrounding said sleeve and engageable with said friction surface, said sprial element including a relatively wide central section anchored to said sleeve and convolutes on either side thereof converging in width toward both ends of the spiral element, spring loaded means carried by said first member for normally maintaining both of the ends of said spiral element expanded into clutching engagement with said friction surface to lock said members against relative movement, and means including a manually operable means carried by said first member for engaging said last named means to simultaneously rotate the ends of said spiral element in a direction to disengage said friction surface to permit relative rotary movement between said members.

10. An articulated connection, comprising a first member having a cylindrical bore therein defining a friction surface, a second member including a cylindrical sleeve journalled for relative rotary movement within said bore, a spiral element having a relatively wide section, with oppositely extending converging convolutes terminating in a pair of relatively narrow ends having radially inwardly projecting tabs, a lug formed integral with said wide section for anchorage to said sleeve, a support carried in said sleeve, a pair of oppositely rotatable axially spaced arms pivotally mounted on said support with one of said arms engaging one of said projecting tabs and the other arm engaging the other of said tabs, a torsion spring mounted about said support between said arms and secured to said arms for biasing the same in opposite directions to normally bias the ends of said spiral element into frictional engagement with said friction surface to lock said members against relative rotary movement, and a slidable bar mounted parallel to said support with cam surfaces thereon for engaging said arms on opposite sides thereof for rotating the same in opposite directions to contract the ends of said spiral element out of engagement with said friction surface to permit relative rotary movement between said members.

11. In a hinged joint, the combination of a first member having a cylindrical opening therein to define a friction surface, a second member including a cylindrical sleeve journalled for rotary movement within said cylindrical opening, a coil element associated with said members and encompassing said sleeve, said coil element having a relatively wide lug carrying portion secured to said sleeve and tapered convolutes decreasing in width therefrom to provide energizing sections adjacent both ends of said coil element, separate arms for engaging each end of said coil element, spring means for biasing said arms toward rotation in opposite directions to lock said members against relative rotary movement through said coil element, and a bar having laterally spaced cams on opposite sides thereof slidably mounted in contiguous relation to said arms to rotate the same against the bias of said spring to contract said energizing sections of said coil element to permit relative rotary movement between said members.

References Cited in the file of this patent

UNITED STATES PATENTS

| | | |
|---|---|---|
| 1,043,423 | Hess | Nov. 5, 1912 |
| 1,826,462 | Dixon et al. | Oct. 6, 1931 |
| 1,968,810 | Dixon | Aug. 7, 1934 |
| 1,973,671 | Stevenson | Sept. 11, 1934 |
| 2,125,543 | Chandler | Aug. 2, 1938 |
| 2,380,590 | Frantz | July 31, 1945 |
| 2,434,480 | Anderson | Jan. 13, 1948 |
| 2,573,032 | Lambert | Oct. 30, 1951 |

FOREIGN PATENTS

| | | |
|---|---|---|
| 263,041 | Great Britain | Dec. 23, 1926 |
| 370,836 | Great Britain | Apr. 14, 1932 |
| 928,046 | France | Nov. 17, 1947 |